(12) United States Patent
Shimizu

(10) Patent No.: US 8,217,633 B2
(45) Date of Patent: Jul. 10, 2012

(54) VOLTAGE STEP-UP/STEP-DOWN SWITCHING REGULATOR AND CONTROL METHOD THEREOF

(75) Inventor: Shinya Shimizu, Amagasaki (JP)

(73) Assignee: Ricoh Company, Ltd., Tokyo (JP)

( * ) Notice: Subject to any disclaimer, the term of this patent is extended or adjusted under 35 U.S.C. 154(b) by 251 days.

(21) Appl. No.: 11/805,751

(22) Filed: May 23, 2007

(65) Prior Publication Data

US 2007/0273341 A1 Nov. 29, 2007

(30) Foreign Application Priority Data

May 23, 2006 (JP) ................................. 2006-142755

(51) Int. Cl.
*G05F 1/613* (2006.01)
*G05F 3/16* (2006.01)
*G05F 1/24* (2006.01)

(52) U.S. Cl. ........................................ 323/259; 323/224

(58) Field of Classification Search .................. 323/224, 323/282, 259

See application file for complete search history.

(56) References Cited

U.S. PATENT DOCUMENTS

| | | | | |
|---|---|---|---|---|
| 3,999,111 A | * | 12/1976 | Bailey | 363/27 |
| 5,831,418 A | * | 11/1998 | Kitagawa | 323/222 |
| 5,939,871 A | * | 8/1999 | Tanaka | 323/285 |
| 6,232,752 B1 | * | 5/2001 | Bissell | 323/225 |
| 2004/0004470 A1 | * | 1/2004 | Yoshida et al. | 323/284 |
| 2005/0116692 A1 | * | 6/2005 | Sugiyama | 323/222 |
| 2005/0253568 A1 | * | 11/2005 | Morimoto | 323/282 |
| 2006/0186867 A1 | * | 8/2006 | Kataoka | 323/282 |
| 2006/0214650 A1 | * | 9/2006 | Hirooka | 323/311 |
| 2007/0145961 A1 | * | 6/2007 | Hasegawa et al. | 323/282 |

FOREIGN PATENT DOCUMENTS

| | | |
|---|---|---|
| JP | 2004-260509 | 9/2004 |
| JP | 2004-328964 | 11/2004 |

OTHER PUBLICATIONS

Gaboriault et al., A High Efficiency, Non-Inverting, Buck-Boost DC-DC Converter, Sep. 27, 2004, IEEE, APEC'04, 1411-1415.*

* cited by examiner

*Primary Examiner* — Jue Zhang
(74) *Attorney, Agent, or Firm* — Cooper & Dunham LLP

(57) ABSTRACT

A switching regulator is provided that includes a step-down circuit configured to output a voltage lower than an input voltage, a step-up circuit configured to output a voltage higher than the input voltage, and a control unit having a voltage detector configured to detect an output voltage and being configured to prohibit operation of the step-up circuit until the output voltage rises to a first voltage lower than the input voltage.

11 Claims, 4 Drawing Sheets

VOLTAGE STEP-UP/STEP-DOWN SWITCHING REGULATOR AND CONTROL METHOD THEREOF

TECHNICAL FIELD

The present disclosure relates to a voltage step-up/step-down switching regulator and a control method thereof, and more particularly, to a voltage step-up/step-down switching regulator capable of changing an output voltage and a control method thereof.

BACKGROUND

Recently, a communications system such as a mobile telephone system has come into widespread use. Such a communications system includes a transmission amplifier for amplifying a transmission signal. Since the transmission amplifier has a wide dynamic range of an output signal, a power supply voltage of the transmission amplifier is configured to be changed according to an output level of the transmission amplifier by using a voltage step-up/step-down switching regulator so as to effectively drive the transmission amplifier.

FIG. 1 is a block diagram illustrating a conventional voltage step-up/step-down switching regulator 10.

The block diagram of FIG. 1 illustrates a power supply circuit capable of controlling an output voltage $V_{out}$ of the voltage step-up/step-down switching regulator 10 used as a power supply for a transmission amplifier between a voltage lower than an input voltage $V_{in}$ of the voltage step-up/step-down switching regulator 10 and a voltage higher than the input voltage $V_{in}$ by inputting a control voltage $V_s$ varying according to the output level of the transmission amplifier.

The voltage step-up/step-down switching regulator 10 includes a reference voltage source 111, an error amplifier (EAMP) 11, a 100% duty cycle protection circuit 13, a step-down control circuit 14, a step-down driver circuit 15, a step-down switching transistor M1, a step-down rectification transistor M2, a step-up control circuit 17, a step-up driver circuit 18, a step-up switching transistor M3, a step-up rectification transistor M4, an inductor L1, a resistor R11, and a resistor R12. The control voltage $V_s$ is input to the voltage step-up/step-down switching regulator 10.

The control voltage $V_s$ is applied between one end (left end in FIG. 1) of the resistor R12 and ground. A feedback voltage of the output voltage $V_{out}$ is applied to an inverted input terminal of the error amplifier 11 through the resistors R11 and R12, and a reference voltage $V_{ref}$ is applied to a non-inverted input terminal of the error amplifier 11. Output of the error amplifier (EAMP) 11 is input to the step-down control circuit 14 and the step-up control circuit 17.

An output terminal of the 100% duty cycle protection circuit 13 is connected to the step-up control circuit 17 so as not to produce a 100% duty cycle.

Further, a step-down triangular wave D_TRIWAV for performing PWM (Pulse Width Modulation) control in a step-down operation is input to the step-down control circuit 14, and a step-up triangular wave U_TRIWAV for performing PWM control in a step-up operation is input to the step-up control circuit 17.

Through the step-down driver circuit 15, the step-down control circuit 14 controls a gate voltage of the step-down switching transistor M1 comprised of a PMOS transistor and a gate voltage of the step-down rectification transistor M2 comprised of a NMOS transistor.

Through the step-up driver circuit 18, the step-up control circuit 17 controls a gate voltage of the step-up switching transistor M3 comprised of a NMOS transistor and a gate voltage of the step-up rectification transistor M4 comprised of a PMOS transistor.

An output voltage $V_{out17}$ of the step-up control circuit 17 is expressed by the following formula:

$$V_{out17} = V_{ref}(1+R11/R12) - V_s \times R11/R12 \tag{1}$$

According to the formula 1, when the control voltage $V_s$ is zero, the output voltage $V_{out17}$ is equal to an output voltage of a normal voltage step-up/step-down switching regulator. However, when the control voltage $V_s$ of a certain value is applied, the output voltage $V_{out17}$ drops according to an increase in the control voltage $V_s$.

There is a quick response power supply circuit having a wide control range formed by combining a step-up circuit converter and a quick response step-down element. However, in a method in which the conventional voltage step-up/step-down switching regulator 10 is used, when the control voltage $V_s$ rapidly drops to rapidly increase the output voltage $V_{out}$ from low to high, a voltage difference between the inverted input terminal and the non-inverted input terminal of the error amplifier 11 increases due to a delay in response, and the output of the error amplifier 11 rises, causing a step-up circuit to operate even when the output voltage $V_{out}$ is lower than the input voltage $V_{in}$.

In the step-up circuit, when energy is stored in an inductor LX, current flows to ground, resulting in a large loss compared to a step-down circuit. Further, in the process of storing energy in the inductor LX, since power is not supplied to an output terminal of the voltage step-up/step-down switching regulator 10, response is slow compared to the step-down operation, causing a delay in rise of the output voltage $V_{out}$.

In the conventional method, responsiveness is improved by boosting a voltage and reducing the boosted voltage using a quick response step-down element such as a regulator. However, power supply efficiency is not improved.

BRIEF SUMMARY

This patent specification describes a novel switching regulator which includes a step-down circuit configured to output a voltage lower than an input voltage, a step-up circuit configured to output a voltage higher than the input voltage, and a control unit having a voltage detector configured to detect an output voltage and being configured to prohibit operation of the step-up circuit until the output voltage rises to a first voltage that is lower than the input voltage.

This patent specification further describes a novel method for controlling a switching regulator, including the steps of detecting an output voltage and prohibiting a step-up operation until the output voltage rises to a first voltage that is lower than an input voltage.

BRIEF DESCRIPTION OF THE DRAWINGS

A more complete appreciation of the subject matter of the disclosure and many of the attendant advantages and features thereof will be readily obtained as the same becomes better understood by reference to the following detailed description when considered in connection with the accompanying drawings, wherein.

DETAILED DESCRIPTION OF PREFERRED EMBODIMENTS

Figure 1:
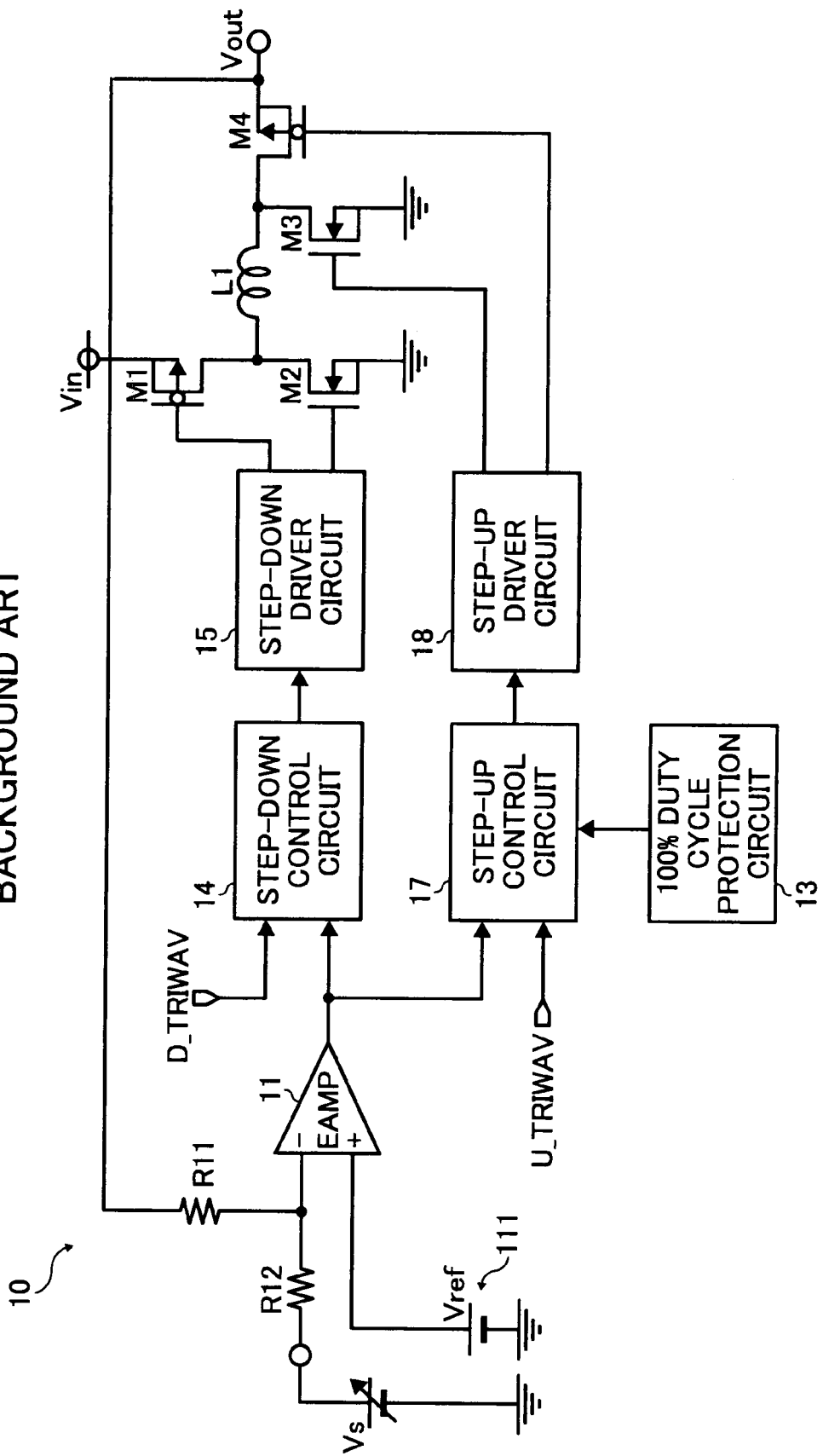
FIG. 1 illustrates a conventional voltage step-up/step-down switching regulator.

In describing preferred embodiments illustrated in the drawings, specific terminology is employed for the sake of clarity. However, the disclosure of this patent specification is not intended to be limited to the specific terminology so selected and it is to be understood that each specific element includes all technical equivalents that operate in a similar manner. Referring now to the drawings, wherein like reference numerals designate identical or corresponding parts throughout the several views, particularly to FIG. 2, a voltage step-up/step-down switching regulator according to an exemplary embodiment is described.

Figure 2:
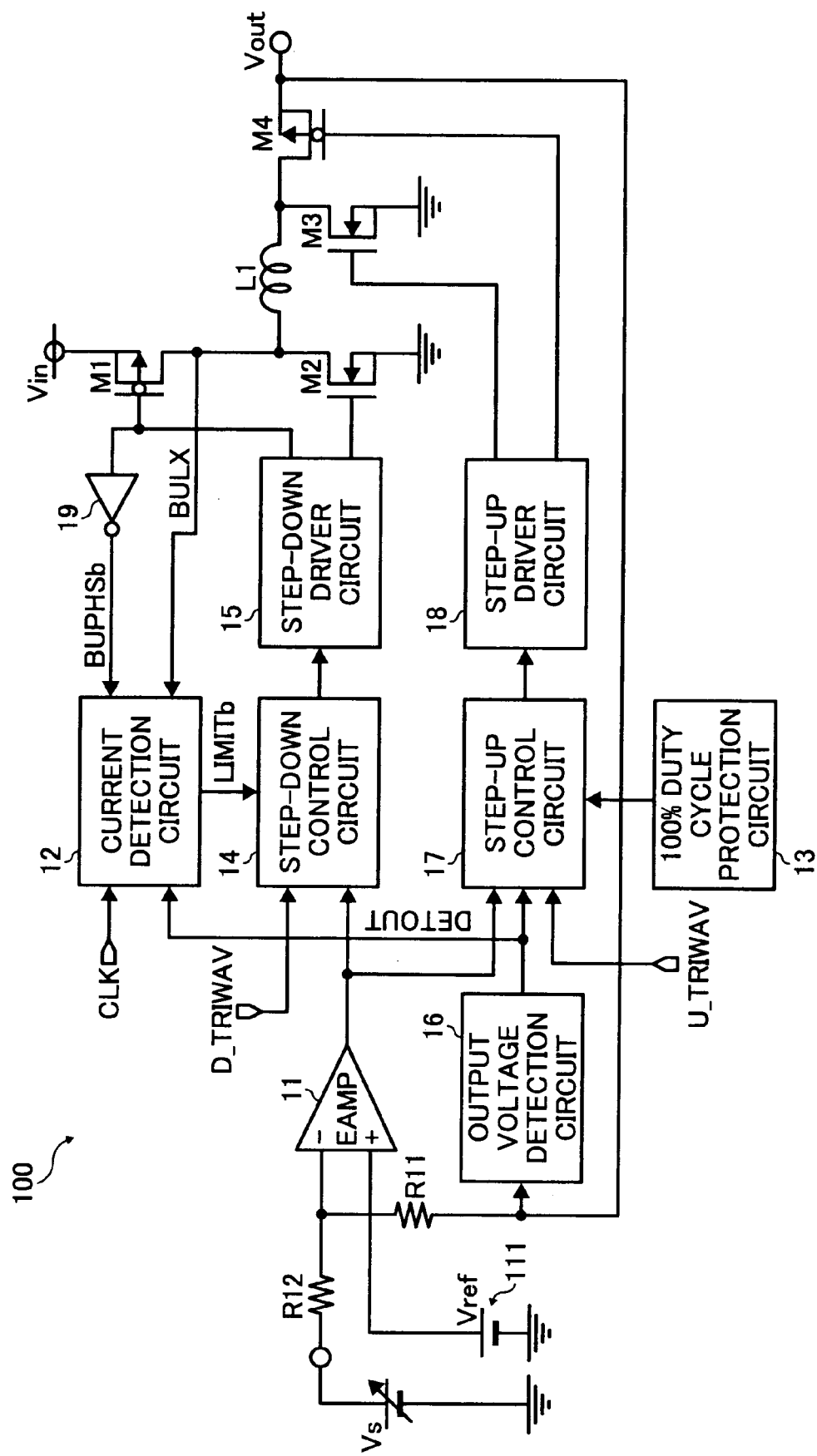
FIG. 2 illustrates a block diagram of a voltage step-up/step-down switching regulator which employs a control method for voltage step-up/step-down switching regulator operations, according to an exemplary embodiment of the present disclosure.

FIG. 2 illustrates a voltage step-up/step-down switching regulator 100 which employs a control method for voltage step-up/step-down operations according to an exemplary embodiment of the present disclosure.

The voltage step-up/step-down switching regulator 100 includes a reference voltage source 111, an error amplifier 11, a current detection circuit 12, a 100% duty cycle protection circuit 13, a step-down control circuit 14, a step-down driver circuit 15, a step-down switching transistor M1, a step-down rectification transistor M2, an output voltage detection circuit 16, a step-up control circuit 17, a step-up driver circuit 18, a step-up switching transistor M3, a step-up rectification transistor M4, an inductor L1, a resistor R11, a resistor R12, and an inverter 19. The step-down control circuit 14 operates as control means. The step-down driver circuit 15 operates as step-down circuit. The step-down switching transistor M1 is comprised of a PMOS transistor. The step-down rectification transistor M2 is comprised of a NMOS transistor. The step-up control circuit 17 operates as control means. The step-up driver circuit 18 operates as step-up circuit. The step-up switching transistor M3 is comprised of a NMOS transistor. The step-up rectification transistor M4 is comprised of a PMOS transistor. A control voltage $V_s$ is input to the voltage step-up/step-down switching regulator 100.

The voltage step-up/step-down switching regulator 100 illustrated in FIG. 2 is similar to the conventional voltage step-up/step-down switching regulator 10 illustrated in FIG. 1, except that the current detection circuit 12, the output voltage detection circuit 16, and the inverter 19 are added. Identical reference numerals refer to identical function blocks and function elements. A detailed description of known functions and configurations will be omitted when it may obscure the subject matter of the present invention.

Since operations of many portions of the voltage step-up/step-down switching regulator 100 are similar to the operations of the conventional voltage step-up/step-down switching regulator 10 which is described in the background section, only the additional current detection circuit 12 and output voltage detection circuit 16 are described below.

The output voltage detection circuit 16 outputs an output signal DETOUT for prohibiting operation of the step-up control circuit 17 until an output voltage $V_{out}$ of the voltage step-up/step-down switching regulator 100 rises to a first voltage which is lower than an input voltage $V_{in}$ of the voltage step-up/step-down switching regulator 100 or when the output voltage $V_{out}$ drops to or below a second voltage lower than the first voltage. This situation is illustrated as a step-up operation prohibition range in FIG. 3.

Figure 3:
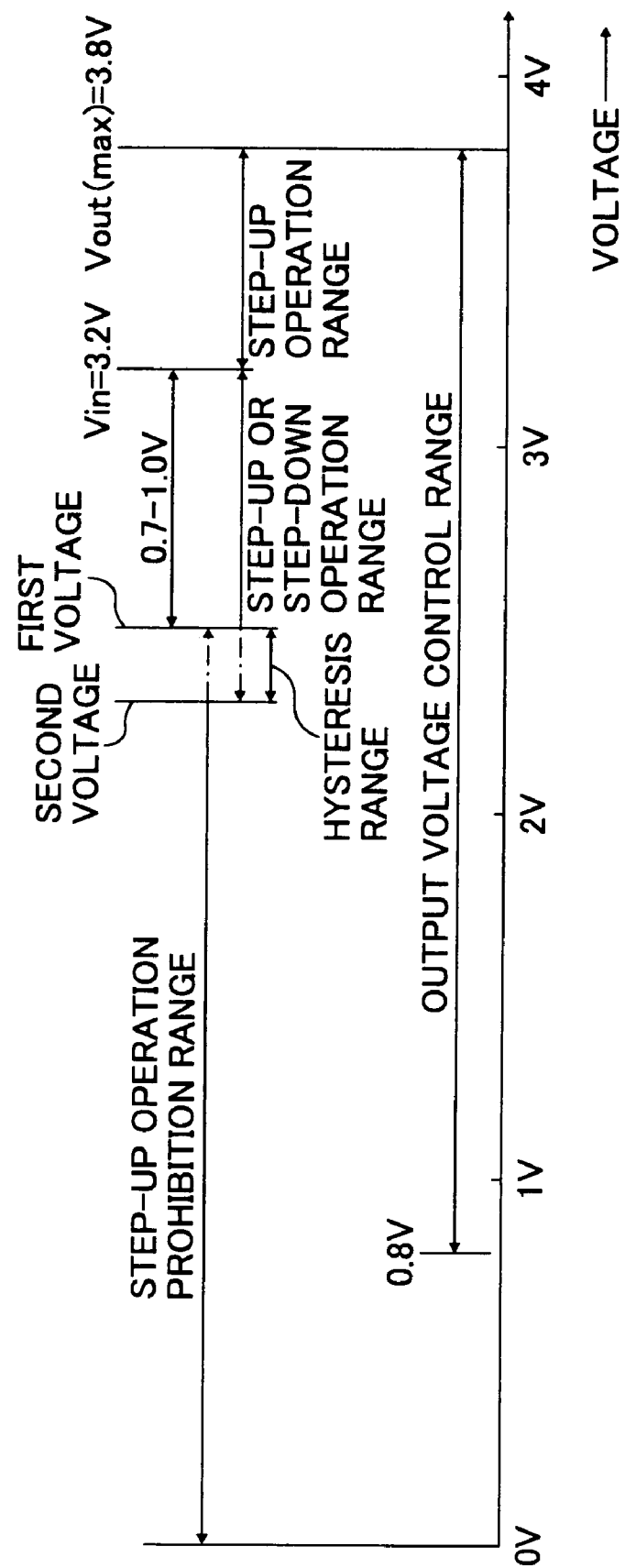
FIG. 3 illustrates operation of the voltage step-up/step-down switching regulator according to an exemplary embodiment of the present disclosure.

FIG. 3 illustrates operation of the voltage step-up/step-down switching regulator 100 according to the present disclosure. In FIG. 3, the horizontal axis indicates voltage. As described later, FIG. 3 illustrates the step-up operation prohibition range, a hysteresis range, a step-up or step-down operation range, a step-up operation range, and an output voltage control range.

Figure 4:
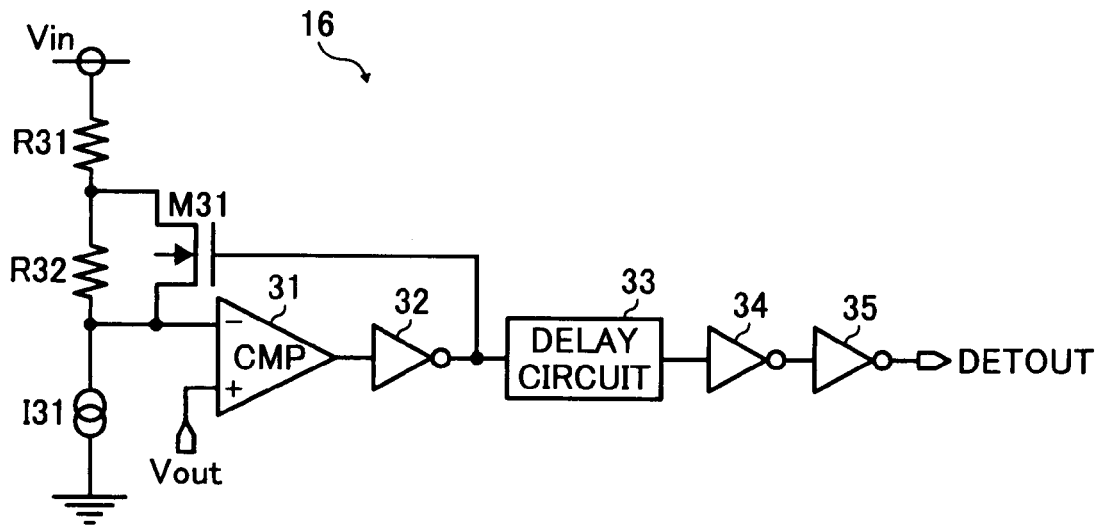
FIG. 4 illustrates a detailed circuit diagram of an output voltage detection circuit for use in the voltage step-up/step-down switching regulator of FIG. 2.

FIG. 4 illustrates a detailed circuit diagram of the output voltage detection circuit 16 for use in the voltage step-up/step-down switching regulator 100 illustrated in FIG. 2.

The output voltage detection circuit 16 includes a resistor R31, a resistor R32, a constant current source 131, a NMOS transistor M31, a comparator 31, an inverter 32, an inverter 34, an inverter 35, and a delay circuit 33.

The resistors R31 and R32, and the constant current source 131, are connected in series between an input voltage line of the voltage step-up/step-down switching regulator 100 and ground.

An inverted input terminal of the comparator 31 is connected to a junction between the resistor R32 and the constant current source 131, and the output voltage $V_{out}$ of the voltage step-up/step-down switching regulator 100 is applied to a non-inverted input terminal of the comparator 31.

An output signal of the comparator 31 is inverted by the inverter 32, and is then input to the delay circuit 33 and to a gate of the NMOS transistor M31.

The source and the drain of the NMOS transistor M31 are connected to both ends of the resistor R32, respectively.

An input voltage of the inverted input terminal of the comparator 31 is equal to a voltage obtained by subtracting a voltage drop across the resistors R31 and R32 from the input voltage $V_{in}$. When the output voltage $V_{out}$ is lower than the input voltage of the inverted input terminal of the comparator 31 and the output signal of the comparator 31 is low, the output signal of the comparator 31 is inverted to high by the inverter 32. The high voltage is applied to the gate of the NMOS transistor M31. Consequently, the NMOS transistor M31 is turned on so as to short the resistor R32. The input voltage of the inverted input terminal of the comparator 31 in this case is defined as a first voltage.

When the output voltage $V_{out}$ reaches or exceeds the first voltage, the output signal of the comparator 31 is inverted to high. Since the output signal of the comparator 31 is inverted to low by the inverter 32, the NMOS transistor M31 is turned off. When the NMOS transistor M31 is turned off, the input voltage of the inverted input terminal of the comparator 31, which is equal to the voltage obtained by subtracting the voltage drop across the series resistance of the resistors R31 and R32 from the input voltage $V_{in}$, becomes lower than the first voltage. The input voltage of the inverted input terminal of the comparator 31 in this case is defined as a second voltage.

Thus, by providing the hysteresis range which is between the first voltage and the second voltage as shown in FIG. 3 for inverting the comparator 31, chattering can be eliminated when the comparator 31 is inverted.

The output of the comparator 31 is input to the delay circuit 33 through the inverter 32 and is delayed for a predetermined period of time. Output of the delay circuit 33 is further inverted by the inverter 34 and is applied to the inverter 35.

Thus, by providing the delay circuit 33, the output of the output voltage detection circuit 16 can be further stabilized.

The output signal DETOUT of the inverter 35 is kept high until the output voltage $V_{out}$ reaches the first voltage. When the output voltage $V_{out}$ exceeds the first voltage, the output signal DETOUT of the inverter 35 becomes low. While the output voltage $V_{out}$ is dropping, the output signal DETOUT of the inverter 35 is kept low until the output voltage $V_{out}$ drops to or below the second voltage.

When the output signal DETOUT of the output voltage detection circuit 16 is high, the step-up control circuit 17 stops the operation and turns the step-up switching transistor M3 off and the step-up rectification transistor M4 on.

When the output signal DETOUT is low, the prohibition of operation of the step-up control circuit 17 is lifted. Therefore, when the output voltage $V_{out}$ is less than or equal to the input voltage $V_{in}$, the step-up control circuit 17 or the step-down control circuit 14 operates depending on the control voltage $V_s$.

Further, when the output voltage $V_{out}$ reaches or exceeds the input voltage $V_{in}$, only the step-up control circuit 17 operates. This situation is also illustrated in FIG. 3.

In FIG. 3, the output voltage control range of the voltage step-up/step-down switching regulator 100 controlled according to the control voltage $V_s$ is from 0.8 to 3.8 V, the input voltage $V_{in}$ is 3.2 V, and the first voltage is obtained by subtracting a voltage of 0.7 to 1.0 V from the input voltage $V_{in}$.

The current detection circuit 12 detects a voltage drop of the step-down switching transistor M1 to evaluate an output current of the voltage step-up/step-down switching regulator 100. When the output current exceeds a predetermined value, the current detection circuit 12 outputs an output signal LIMITb to the step-down control circuit 14 to prohibit operation of the step-down control circuit 14. When the step-down control circuit 14 stops the operation, the step-down switching transistor M1 is turned off and the step-down rectification transistor M2 is turned on.

Figure 5:
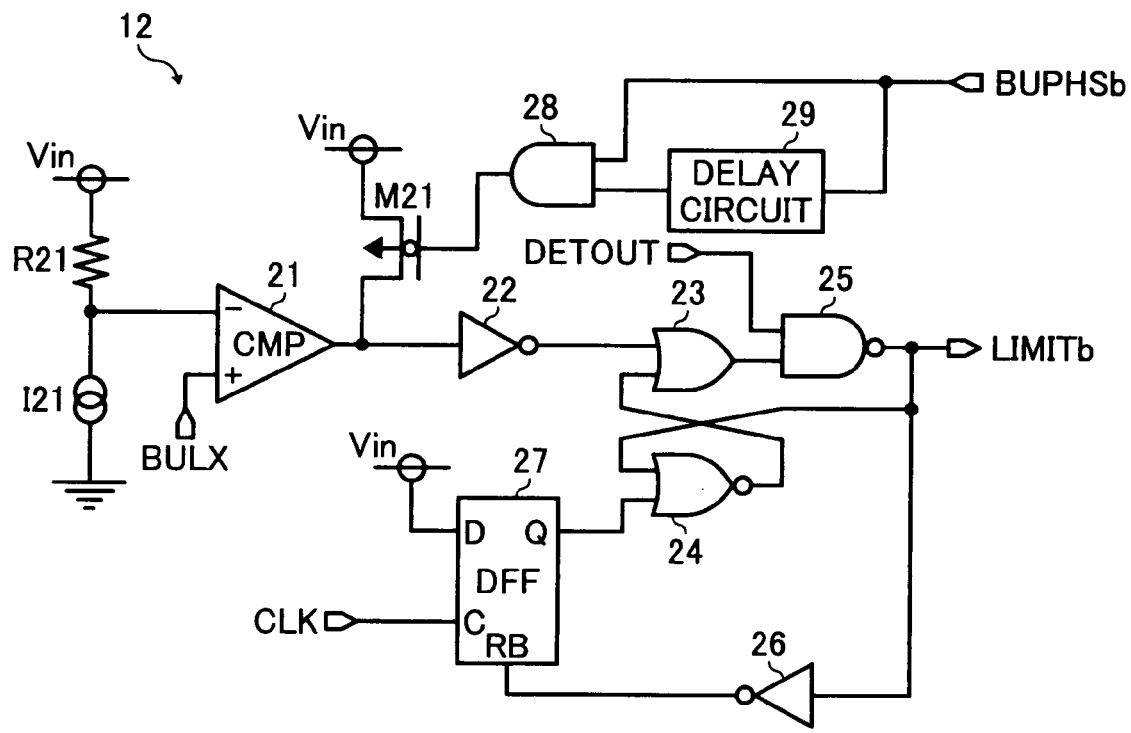
FIG. 5 illustrates a detailed circuit diagram of a current detection circuit for use in the voltage step-up/step-down switching regulator of FIG. 2.

FIG. 5 illustrates a detailed circuit diagram of the current detection circuit 12 for use in the voltage step-up/step-down switching regulator 100 illustrated in FIG. 2.

The current detection circuit 12 includes a resistor R21, a constant current source I21, a comparator 21, an inverter 22, an inverter 26, an OR circuit 23, a NOR circuit 24, a NAND circuit 25, a D-type flip-flop (hereinafter referred to as DFF) 27, a PMOS transistor M21, an AND circuit 28, and a delay circuit 29.

The resistor R21 and the constant current source I21 are connected in series between the input voltage line and ground.

An inverted input terminal of the comparator 21 is connected to a junction between the resistor R21 and the constant current source I21, and a drain voltage (signal BULX) of the step-down switching transistor M1 is applied to a non-inverted input terminal of the comparator 21.

An output signal of the comparator 21 is inverted by the inverter 22 and then applied to an input terminal of the OR circuit 23 and to the input voltage line through the PMOS transistor M21. Another input terminal of the OR circuit 23 is connected to an output terminal of the NOR circuit 24. An output terminal of the OR circuit 23 is connected to an input terminal of the NAND circuit 25. The output signal DETOUT of the output voltage detection circuit 16 is applied to another input terminal of the NAND circuit 25. An output terminal of the NAND circuit 25 is an output terminal of the current detection circuit 12, outputs the output signal LIMITb, and is connected to an input terminal of the NOR circuit 24 and a reset input terminal RB of the DFF 27 through the inverter 26.

Another input terminal of the NOR circuit 24 is connected to an output terminal Q of the DFF 27. A data input terminal D of the DFF 27 is connected to the input voltage line. A clock signal CLK having a frequency identical to a switching cycle of the voltage step-up/step-down switching regulator 100 is input to a clock input terminal C of the DFF 27.

A gate of the PMOS transistor M21 is connected to an output terminal of the AND circuit 28. A gate signal of the step-down switching transistor M1 is inverted by the inverter 19 to be a signal BUPHSb and is input to an input terminal of the AND circuit 28. The signal BUPHSb is delayed by the delay circuit 29 and is applied to another input terminal of the AND circuit 28.

When the step-down switching transistor M1 is off, the signal BUPHSb is low because the gate voltage of the step-down switching transistor M1 is high. Since the signal BUPHSb is applied to the gate of the PMOS transistor M21 through the AND circuit 28 and the delay circuit 29, the PMOS transistor M21 is turned on, and the output of the comparator 21 is fixed at a high level.

Conversely, when the step-down switching transistor M1 is on, the PMOS transistor M21 is turned off and the comparator 21 is released to operate.

In other words, the current detection circuit 12 operates only when the step-down switching transistor M1 is on.

An operation from a time immediately after the voltage step-up/step-down switching regulator 100 is turned on to a time the output voltage $V_{out}$ reaches a target output voltage is now described.

When the output voltage $V_{out}$ is sufficiently low at a time immediately after power is turned on, the operation of the step-up control circuit 17 is prohibited because the output signal DETOUT is high. Also, since there is a considerable difference between the actual output voltage $V_{out}$ and the target output voltage, an output voltage of the error amplifier 11 rises above an amplitude of a step-down triangular wave D_TRIWAV being input to the step-down control circuit 14.

Therefore, the step-down control circuit 14 continues to turn the step-down switching transistor M1 on. As a result, the output voltage $V_{out}$ is directly output from the input voltage line through an inductor LX, resulting in reduced consumption of electricity and rapid rise of the output voltage $V_{out}$.

When the target voltage is less than or equal to the first voltage, the output voltage $V_{out}$ is controlled only by a step-down circuit. If the target voltage is between the first voltage and the input voltage $V_{in}$, a step-up circuit is released to operate when the output voltage $V_{out}$ reaches the first voltage. When the output voltage $V_{out}$ reaches the target voltage, the step-down circuit resumes control.

If the target voltage is more than or equal to the input voltage $V_{in}$, the step-up circuit starts operation when the output voltage $V_{out}$ exceeds the first voltage, and continues to operate until the output voltage $V_{out}$ reaches the target voltage.

An operation for increasing the output voltage $V_{out}$ from a voltage lower than the first voltage to a voltage higher than the first voltage is similar to the above operation when the power is turned on.

To rapidly increase the output voltage $V_{out}$, if a large amount of current flows by charging, for example, an output capacitor (not shown) connected to an output terminal of the voltage step-up/step-down switching regulator 100, a voltage between the source and the drain of the step-down switching transistor M1 increases and a voltage of the signal BULX drops.

When the voltage of the signal BULX is less than or equal to an input voltage of the inverted input terminal of the comparator 21 of the current detection circuit 12, the output of the comparator 21 becomes low. The output signal of the comparator 21 is inverted to high by the inverter 22, setting a flip-flop circuit including the OR circuit 23, the NOR circuit 24, and the NAND circuit 25. Then, a voltage of the output signal LIMITb of the current detection circuit 12 becomes low, stopping the operation of the step-down control circuit 14 and turning the step-down switching transistor M1 off and the step-down rectification transistor M2 on.

However, the clock signal CLK having the frequency identical to the switching cycle is applied to the clock input terminal C of the DFF 27, and the flip-flop circuit including the OR circuit 23, the NOR circuit 24, and the NAND circuit 25 is reset every cycle of the clock signal CLK. Therefore, an off state of the step-down switching transistor M1 is released every cycle of the clock signal CLK.

With the configuration described above, a step-up operation is prohibited to force use of a step-down circuit when an output voltage $V_{out}$ is below a voltage close to but lower than an input voltage $V_{in}$. Therefore, a time required for reaching a target voltage can be minimized, and further, power supply efficiency can be improved.

The present invention may be used for a transmission amplifier power supply for use in, for example, a mobile telephone system, as well as other electronic devices having a transmission capability and a transmission amplifier.

Numerous additional modifications and variations are possible in light of the above teachings. It is therefore to be understood that within the scope of the appended claims, the disclosure of this patent specification may be practiced otherwise than as specifically described herein.

This patent specification is based on Japanese patent application, No. 2006-142755 filed on May 23, 2006 in the Japan Patent Office, the entire contents of which are incorporated by reference herein.

What is claimed is:

1. A switching regulator comprising:
    a step-down circuit configured to output a stepped-down voltage lower than an input voltage;
    a step-up circuit configured to output a stepped-up voltage higher than the input voltage; and
    a control unit comprising a voltage detector configured to detect an output voltage,
    the control unit being configured to prohibit step-up operation of the step-up circuit while allowing step-down operation of the step-down circuit until the output voltage rises to a first voltage, said first voltage being lower than the input voltage,
    wherein in a case that the output voltage rises to the first voltage, the control unit allows the step-down operation of the step-down circuit and the step-up operation of the step-up circuit while the output voltage is (i) higher than a second voltage that is lower than the first voltage and (ii) lower than the input voltage,
    wherein the step-down circuit comprises:
        a step-down switching transistor that receives the input voltage;
        a step-down control circuit configured to control the step-down switching transistor; and
        a detection circuit configured to detect a voltage drop across the step-down switching transistor when the step-down switching transistor is on; and
    wherein the control unit turns the step-down switching transistor off when the voltage drops across the step-down switching transistor to a voltage below a predetermined value, and the control unit releases an off state of the step-down switching transistor cyclically or every predetermined number of cycles.

2. The switching regulator of claim 1, wherein the control unit prohibits the operation of the step-up circuit when the output voltage drops to or below the second voltage.

3. The switching regulator of claim 1,
    wherein the voltage detector comprises a delay circuit, and
    wherein the control unit generates an output signal after a predetermined delay time generated by the delay circuit when the output voltage reaches the first voltage or the second voltage.

4. The switching regulator of claim 1, wherein the output voltage is controlled only by the step-down circuit when the output voltage is less than the first voltage.

5. The switching regulator of claim 1, wherein the control unit only prohibits the step-up operation of the step-up circuit when the output voltage is lower than the first voltage.

6. The switching regulator of claim 1, wherein the control unit allows the step-up operation of the step-up circuit when the output voltage rises above the first voltage.

7. The switching regulator of claim 1, wherein if the output voltage is higher than the first voltage and lower than the input voltage, the control unit allows both the step-down operation and the step-up operation.

8. The switching regulator of claim 1, wherein if the output voltage is higher than the input voltage, the control unit prohibits the step-down operation of the step-down circuit while allowing the step-up operation of the step-up circuit.

9. A method for controlling a switching regulator comprising the steps of:
    detecting an output voltage;
    prohibiting a step-up operation of a step-up circuit of the switching regulator while allowing a step-down operation of a step-down circuit of the switching regulator until the output voltage rises to a first voltage, said first voltage being lower than an input voltage, and
    in a case that the output voltage rises to the first voltage, allowing the step-down operation of the step-down circuit and the step-up operation of the step-up circuit while the output voltage is (i) higher than a second voltage that is lower than the first voltage and (ii) lower than the input voltage;
    detecting a voltage drop across a step-down switching transistor when the step-down switching transistor is on, the step-down switching transistor receiving the input voltage;
    turning the step-down switching transistor off when the voltage drops across the step-down switching transistor to a voltage below a predetermined value; and
    releasing an off state of the step-down switching transistor cyclically or every predetermined number of cycles.

10. The method for controlling the switching regulator of claim 9 further comprising the step of: prohibiting the step-up operation when the output voltage drops to or below the second voltage.

11. The method for controlling the switching regulator of claim 9 further comprising the step of: generating an output signal after a predetermined delay time when the output voltage reaches the first voltage or the second voltage.

* * * * *